United States Patent
Manolakos et al.

(10) Patent No.: US 12,225,630 B2
(45) Date of Patent: **\*Feb. 11, 2025**

(54) MINIMUM POSITIONING REFERENCE SIGNAL (PRS) PROCESSING WHEN MEASUREMENT GAPS ARE NOT CONFIGURED

(71) Applicant: QUALCOMM Incorporated, San Diego, CA (US)

(72) Inventors: Alexandros Manolakos, Escondido, CA (US); Arash Mirbagheri, San Diego, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,607

(22) Filed: Jun. 16, 2023

(65) Prior Publication Data
US 2023/0336976 A1 Oct. 19, 2023

Related U.S. Application Data

(63) Continuation of application No. 17/233,844, filed on Apr. 19, 2021, now Pat. No. 11,736,934.

(51) Int. Cl.
*H04W 8/24* (2009.01)
*H04L 5/00* (2006.01)
(Continued)

(52) U.S. Cl.
CPC .............. *H04W 8/24* (2013.01); *H04L 5/0051* (2013.01); *H04L 27/26025* (2021.01);
(Continued)

(58) Field of Classification Search
CPC ... H04W 8/24; H04W 24/10; H04W 72/0446; H04W 72/0453; H04W 72/21; H04L 5/0051; H04L 27/26025; G01S 1/0428
See application file for complete search history.

(56) References Cited

U.S. PATENT DOCUMENTS 10,512,057 B1 * 12/2019 Maheshwari ......... H04W 16/32
11,470,440 B2 10/2022 Sahai et al.
(Continued)

FOREIGN PATENT DOCUMENTS

CN 103221838 A 7/2013
KR 20200034736 A * 3/2020
(Continued)

OTHER PUBLICATIONS

GPP TS 38.211 Version 16.2.0 Release 16, "Physical channels and modulation", 5G, NR; Jul. 2020 (Year: 2020).*
(Continued)

*Primary Examiner* — Ayaz R Sheikh
*Assistant Examiner* — Louis Samara
(74) *Attorney, Agent, or Firm* — Thien T. Nguyen

(57) ABSTRACT

Disclosed are techniques for wireless communication. In an aspect, a user equipment (UE) transmits, to a network entity, one or more capability messages indicating one or more capabilities of the UE to process positioning reference signals (PRS), the one or more capabilities indicating at least a duration of PRS that the UE can process within a measurement window without a measurement gap, and performs one or more positioning measurements of one or more PRS resources during the measurement window up to the duration of PRS.

31 Claims, 13 Drawing Sheets

Related U.S. Application Data

(60) Provisional application No. 63/016,967, filed on Apr. 28, 2020.

(51) Int. Cl.
  *H04L 27/26* (2006.01)
  *H04W 24/10* (2009.01)
  *H04W 72/0446* (2023.01)
  *H04W 72/0453* (2023.01)
  *H04W 72/21* (2023.01)

(52) U.S. Cl.
  CPC ....... *H04W 24/10* (2013.01); *H04W 72/0446* (2013.01); *H04W 72/0453* (2013.01); *H04W 72/21* (2023.01)

(56) References Cited

U.S. PATENT DOCUMENTS

| | | | |
|---|---|---|---|
| 2012/0252487 A1* | 10/2012 | Siomina | H04W 24/10 455/456.1 |
| 2013/0237247 A1* | 9/2013 | Lee | G01S 5/10 455/456.1 |
| 2013/0267246 A1* | 10/2013 | Wang | H04W 24/00 455/456.1 |
| 2017/0105134 A1* | 4/2017 | Lee | H04B 17/318 |
| 2018/0213425 A1 | 7/2018 | Huang et al. | |
| 2019/0208550 A1* | 7/2019 | Ko | H04W 72/0446 |
| 2019/0230619 A1 | 7/2019 | Cui et al. | |
| 2019/0245663 A1* | 8/2019 | Kim | H04L 5/0048 |
| 2020/0228381 A1* | 7/2020 | Manolakos | H04W 64/00 |
| 2020/0382263 A1 | 12/2020 | Xu et al. | |
| 2021/0014752 A1* | 1/2021 | Axmon | H04W 36/26 |
| 2021/0067990 A1* | 3/2021 | Opshaug | H04W 4/029 |
| 2021/0302561 A1* | 9/2021 | Bayesteh | G01S 13/42 |
| 2021/0337377 A1 | 10/2021 | Manolakos | |
| 2021/0400620 A1* | 12/2021 | Tao | H04W 24/10 |
| 2022/0006589 A1* | 1/2022 | Dwivedi | G01S 1/0428 |
| 2022/0116089 A1* | 4/2022 | Khoryaev | H04B 7/043 |

FOREIGN PATENT DOCUMENTS

| | | | | |
|---|---|---|---|---|
| WO | 2019027540 A1 | 2/2019 | | |
| WO | 2019032658 A1 | 2/2019 | | |
| WO | 2019157052 | 8/2019 | | |
| WO | WO-2019157052 A1 * | 8/2019 | ............. | G01S 1/045 |
| WO | WO-2019162513 A1 * | 8/2019 | ............. | H04W 24/10 |
| WO | WO-2020068295 A1 * | 4/2020 | ............. | G01S 5/0215 |
| WO | WO-2021194801 A1 * | 9/2021 | ............. | H04L 5/0051 |
| WO | WO-2022155465 A1 * | 7/2022 | ............. | G01S 1/0428 |

OTHER PUBLICATIONS

International Preliminary Report on Patentability—PCT/US2021/028128, The International Bureau of WIPO—Geneva, Switzerland, Nov. 10, 2022.

International Search Report and Written Opinion—PCT/US2021/028128—ISA/EPO—Aug. 4, 2021.

Taiwan Search Report—TW110114100—TIPO—Nov. 25, 2024.

* cited by examiner

MINIMUM POSITIONING REFERENCE SIGNAL (PRS) PROCESSING WHEN MEASUREMENT GAPS ARE NOT CONFIGURED

CROSS-REFERENCE TO RELATED APPLICATIONS

The present Application for Patent is a continuation of U.S. patent application Ser. No. 17/233,844, entitled "MINIMUM POSITIONING REFERENCE SIGNAL (PRS) PROCESSING WHEN MEASUREMENT GAPS ARE NOT CONFIGURED," filed Apr. 19, 2021, which claims the benefit of U.S. Provisional Application No. 63/016,967, entitled "MINIMUM POSITIONING REFERENCE SIGNAL (PRS) PROCESSING WHEN MEASUREMENT GAPS ARE NOT CONFIGURED," filed Apr. 28, 2020, each of which is assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes transmitting, to a network entity, one or more capability messages indicating one or more capabilities of the UE to process positioning reference signals (PRS), the one or more capabilities indicating at least a duration of PRS that the UE can process within a measurement window without a measurement gap; and performing one or more positioning measurements of one or more PRS resources during the measurement window up to the duration of PRS.

In an aspect, a user equipment (UE) includes a memory; at least one transceiver; and at least one processor communicatively coupled to the memory and the at least one transceiver, the at least one processor configured to: cause the at least one transceiver to transmit, to a network entity, one or more capability messages indicating one or more capabilities of the UE to process positioning reference signals (PRS), the one or more capabilities indicating at least a duration of PRS that the UE can process within a measurement window without a measurement gap; and perform one or more positioning measurements of one or more PRS resources during the measurement window up to the duration of PRS.

In an aspect, a user equipment (UE) includes means for transmitting, to a network entity, one or more capability messages indicating one or more capabilities of the UE to process positioning reference signals (PRS), the one or more capabilities indicating at least a duration of PRS that the UE can process within a measurement window without a measurement gap; and means for performing one or more positioning measurements of one or more PRS resources during the measurement window up to the duration of PRS.

In an aspect, a non-transitory computer-readable medium storing computer-executable instructions that, when executed by a user equipment (UE), cause the UE to: transmit, to a network entity, one or more capability messages indicating one or more capabilities of the UE to process positioning reference signals (PRS), the one or more capabilities indicating at least a duration of PRS that the UE can process within a measurement window without a measurement gap; and perform one or more positioning measurements of one or more PRS resources during the measurement window up to the duration of PRS.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
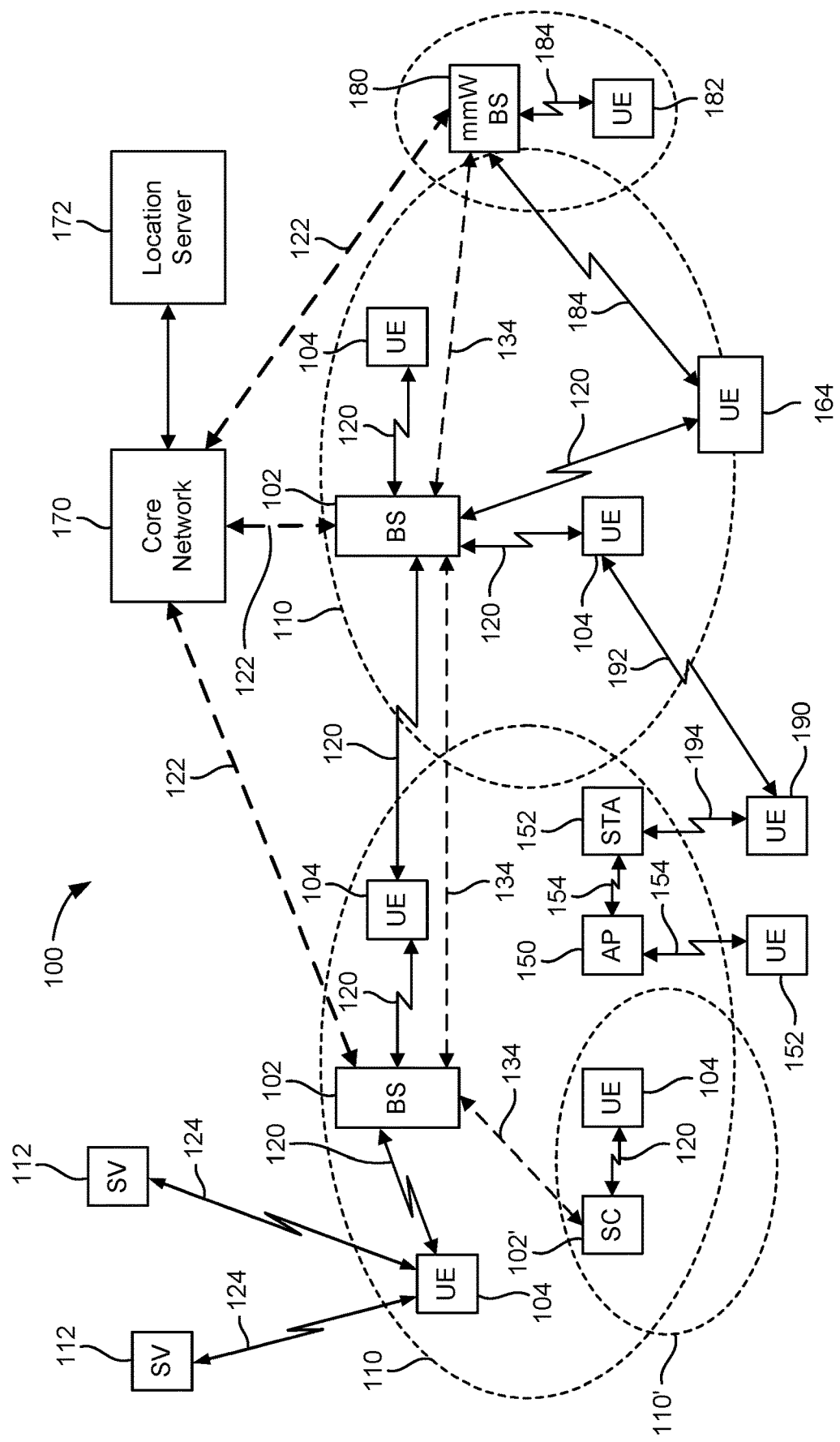
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
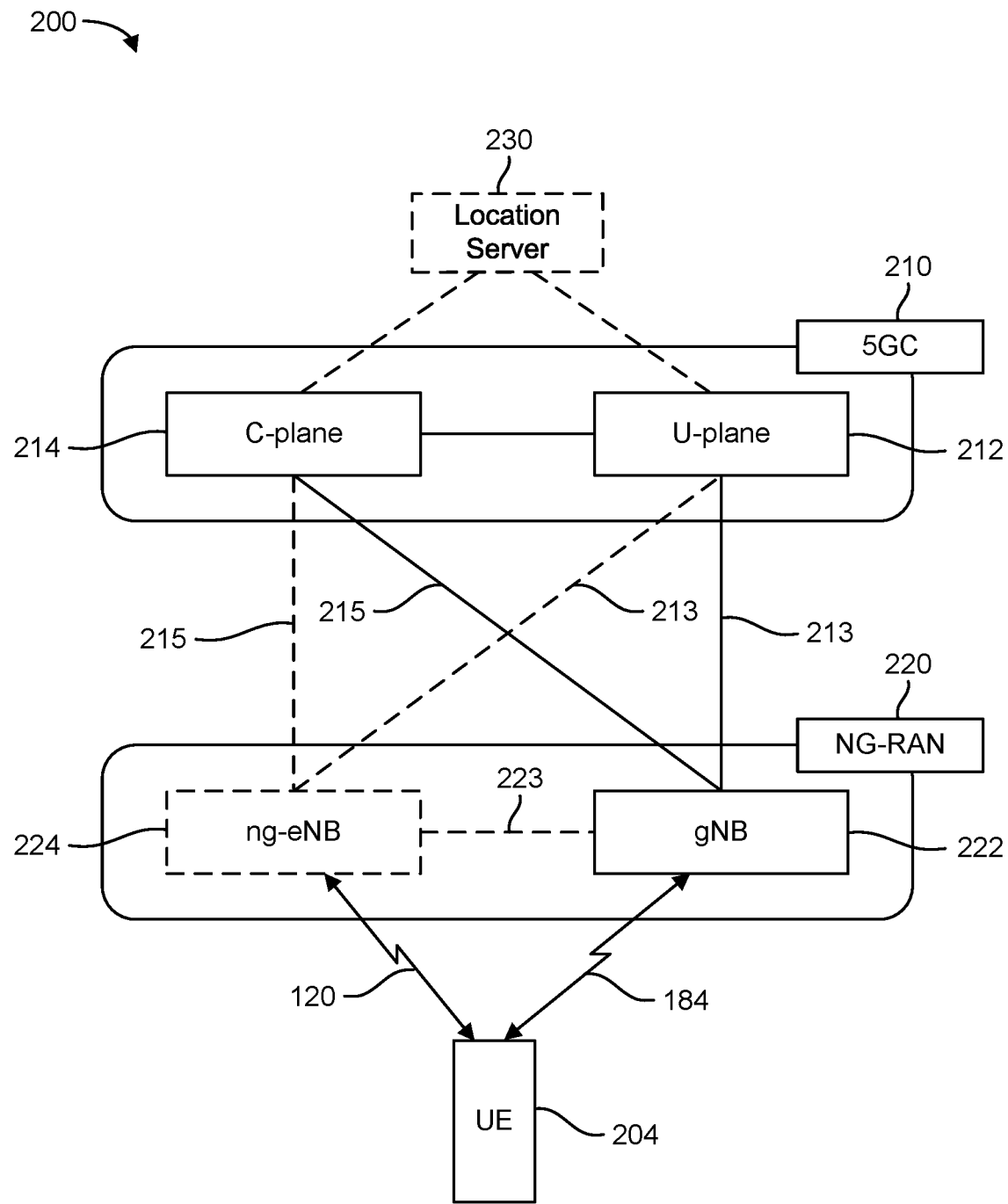
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNB s 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
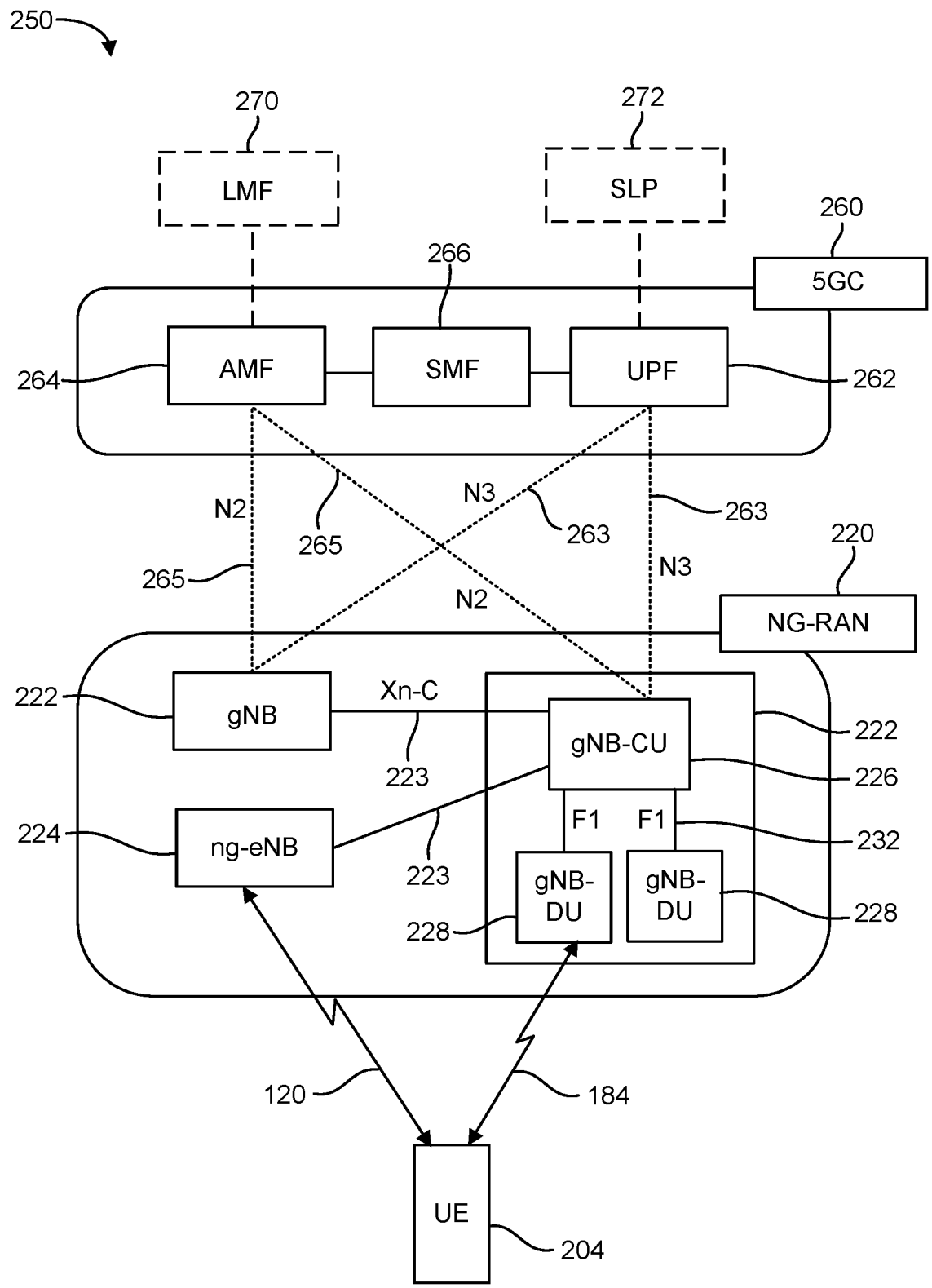

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204

(e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
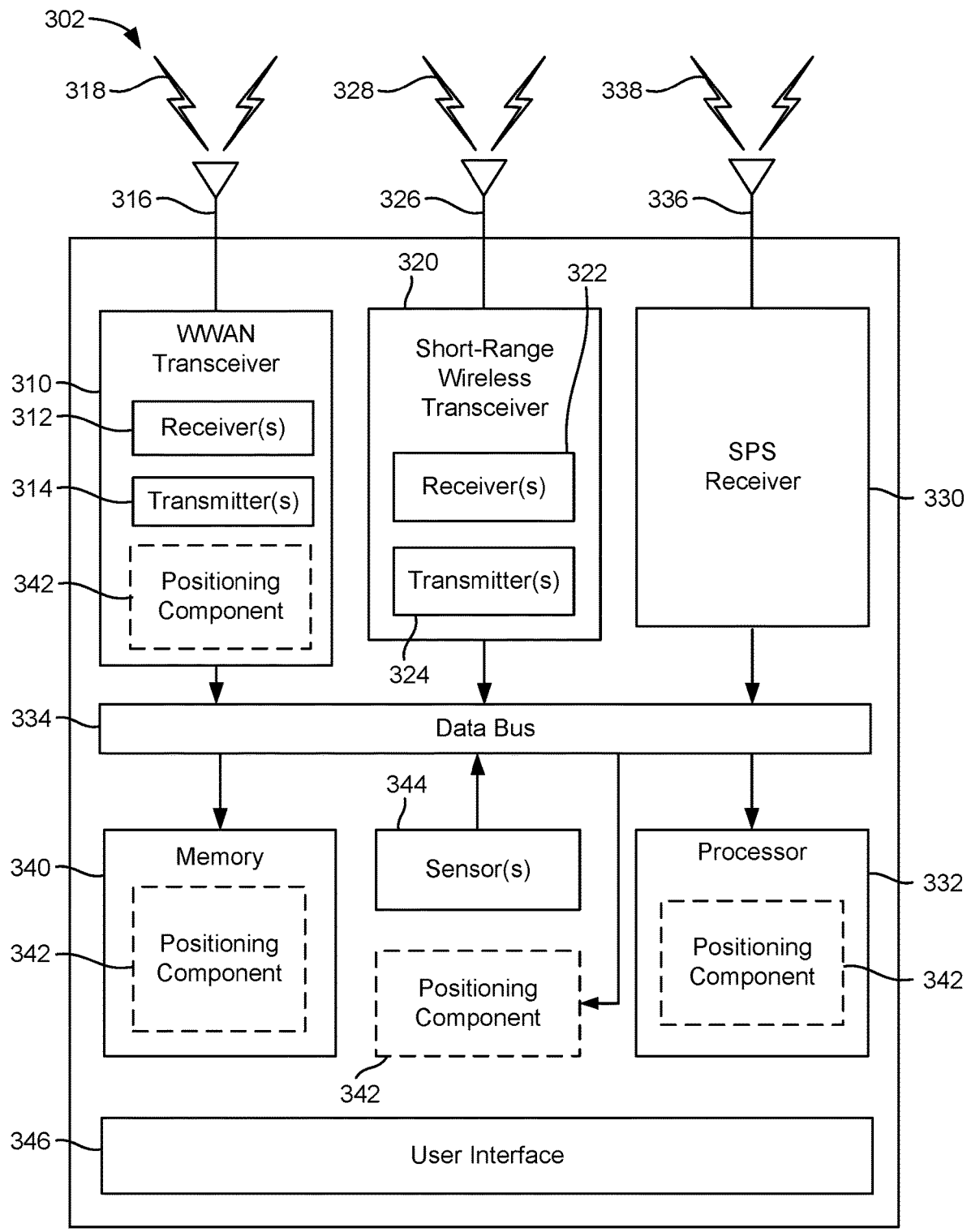
FIGS. 3A, 3B, and 3C are simplified block diagrams of several sample aspects of components that may be employed in a user equipment (UE), a base station, and a network entity, respectively, and configured to support communications as taught herein.
Figure 3B:
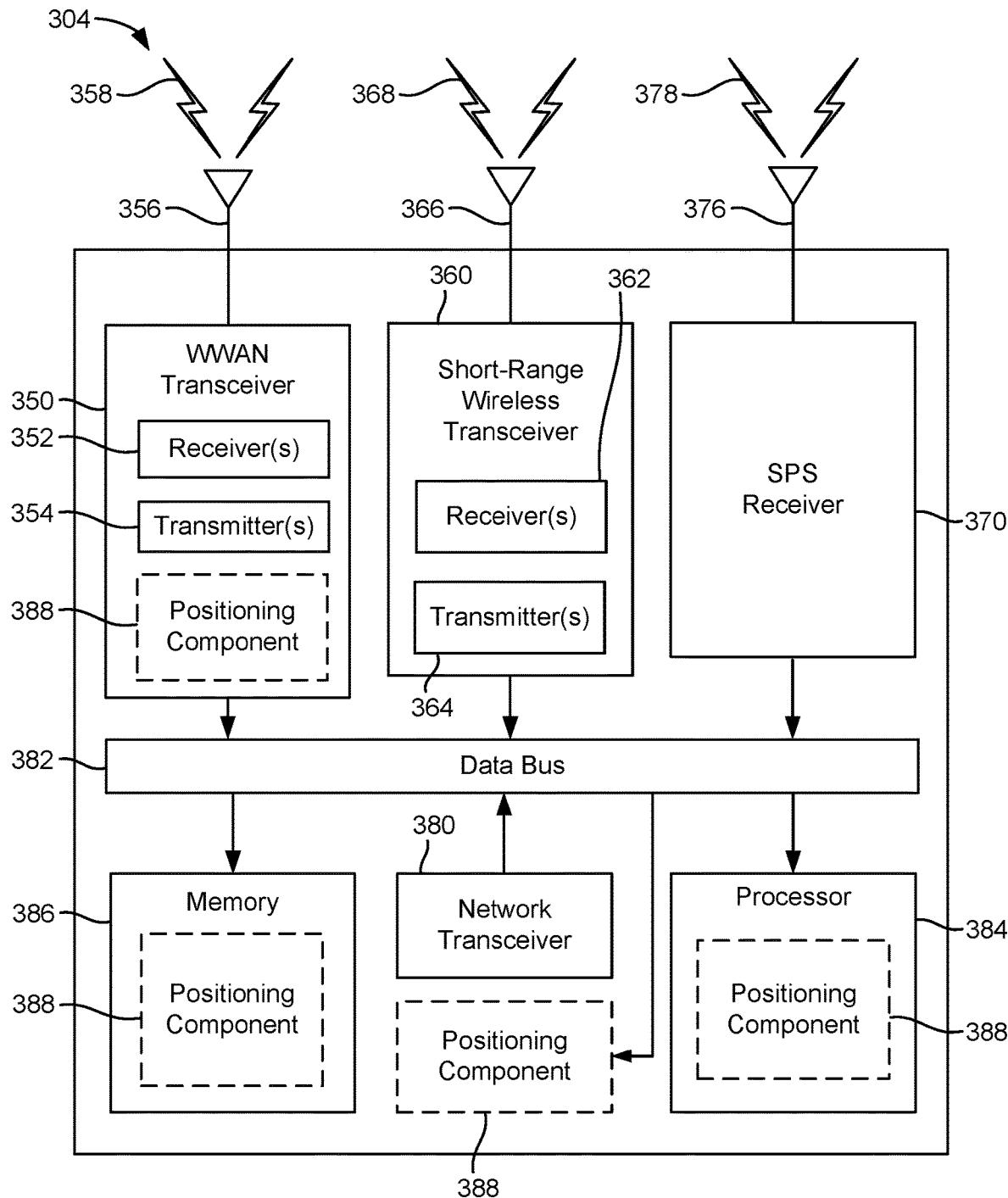
Figure 3C:
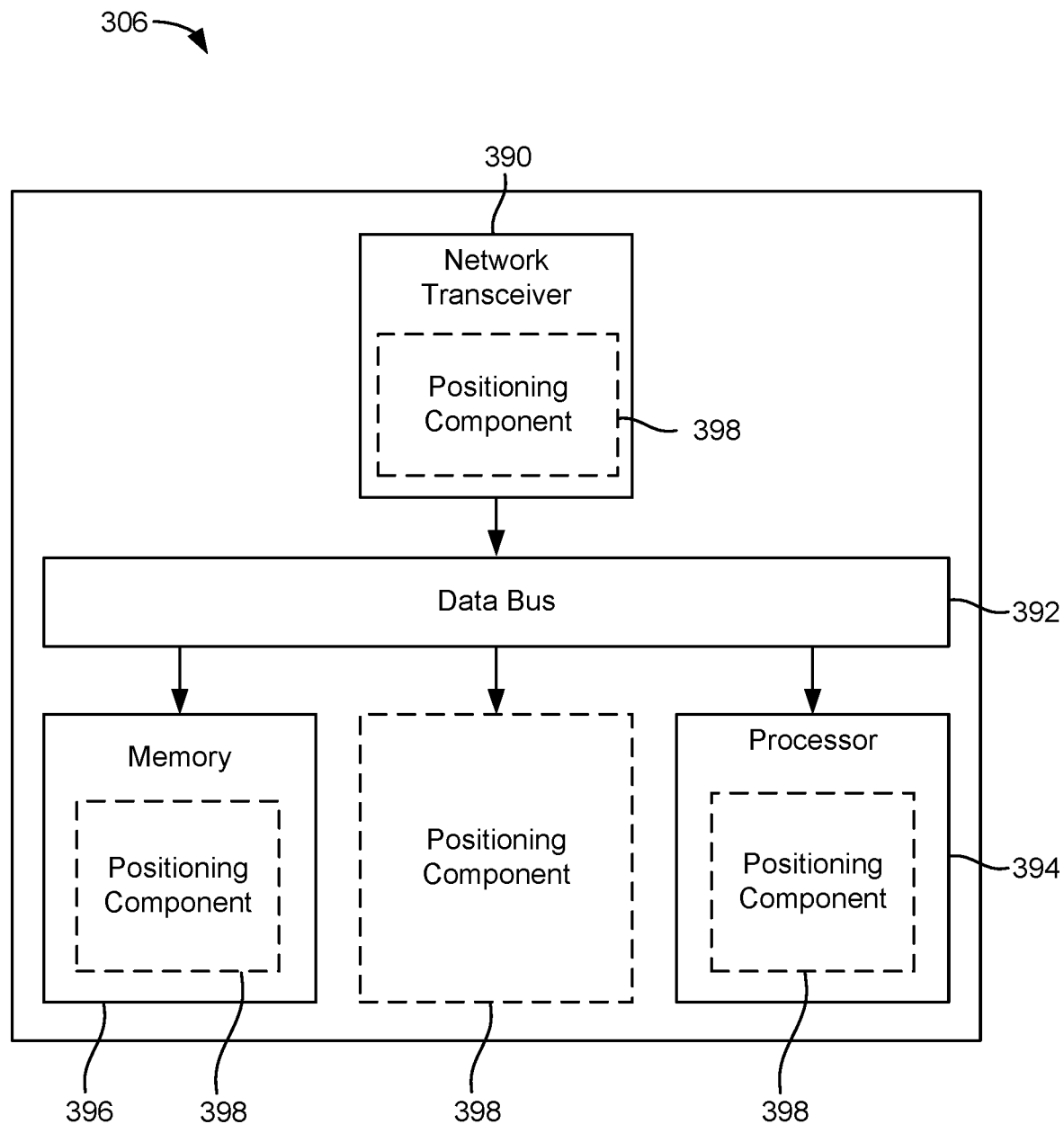

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the network transceiver 380 to communicate with other base stations 304 or network entities 306 over one or more wired or wireless backhaul links. As another example, the network entity 306 may employ the network transceiver 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning components 342, 388, and 398 may be external to the processors 332, 384, and 394 (e.g., part of a modem processing system, integrated with another processing system, etc.). Alternatively, the positioning components 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the WWAN transceiver 310, the memory 340, the processor 332, or any combination thereof, or may be a standalone component. FIG. 3B illustrates possible locations of the positioning component 388, which may be, for example, part of the WWAN transceiver 350, the memory 386, the processor 384, or any combination thereof, or may be a standalone component. FIG. 3C illustrates possible locations of the positioning component 398, which may be, for example, part of the network transceiver 390, the memory 396, the processor 394, or any combination thereof, or may be a standalone component.

The UE 302 may include one or more sensors 344 coupled to the processor 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processor 384 in more detail, in the downlink, IP packets from the network entity 306 may be provided to the processor 384. The processor 384 may implement functionality for an RRC layer, a packet data convergence protocol (PDCP) layer, a radio link control (RLC) layer, and a medium access control (MAC) layer. The processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processor 332, which implements Layer-3 (L3) and Layer-2 (L2) functionality.

In the uplink, the processor 332 provides demultiplexing between transport and logical channels, packet reassembly, deciphering, header decompression, and control signal processing to recover IP packets from the core network. The processor 332 is also responsible for error detection.

Similar to the functionality described in connection with the downlink transmission by the base station 304, the processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processor 384.

In the uplink, the processor 384 provides demultiplexing between transport and logical channels, packet reassembly, deciphering, header decompression, control signal processing to recover IP packets from the UE 302. IP packets from the processor 384 may be provided to the core network. The processor 384 is also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning components 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be ±500 microseconds (µs). In some cases, when any of the resources used for the positioning measurement are in FR1, the value range for the uncertainty of the expected RSTD may be ±32 µs. In other cases, when all of the resources used for the positioning measurement(s) are in FR2, the value range for the uncertainty of the expected RSTD may be ±8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
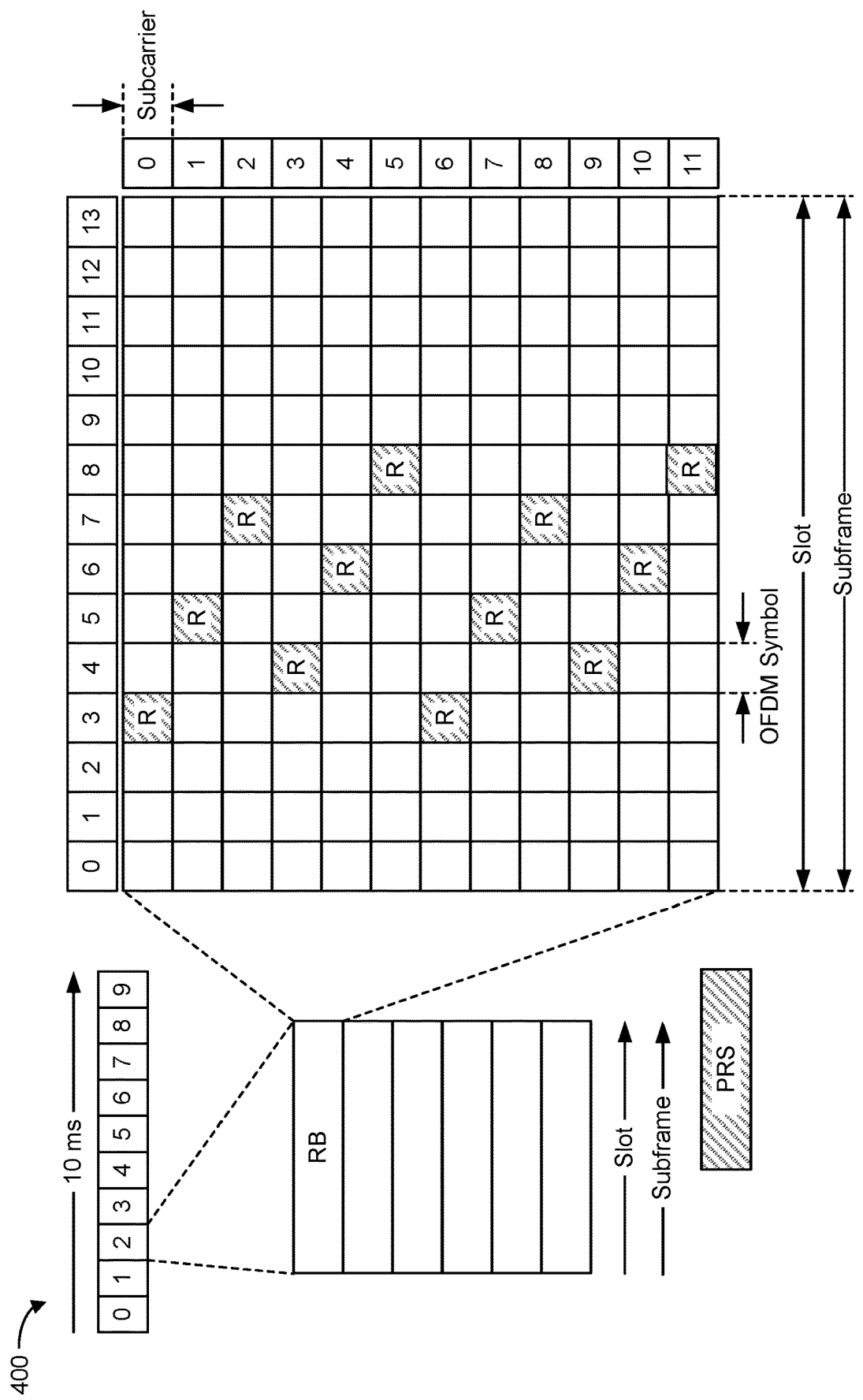
FIGS. 4A and 4B are diagrams illustrating example frame structures and channels within the frame structures, according to aspects of the disclosure.
Figure 4B:
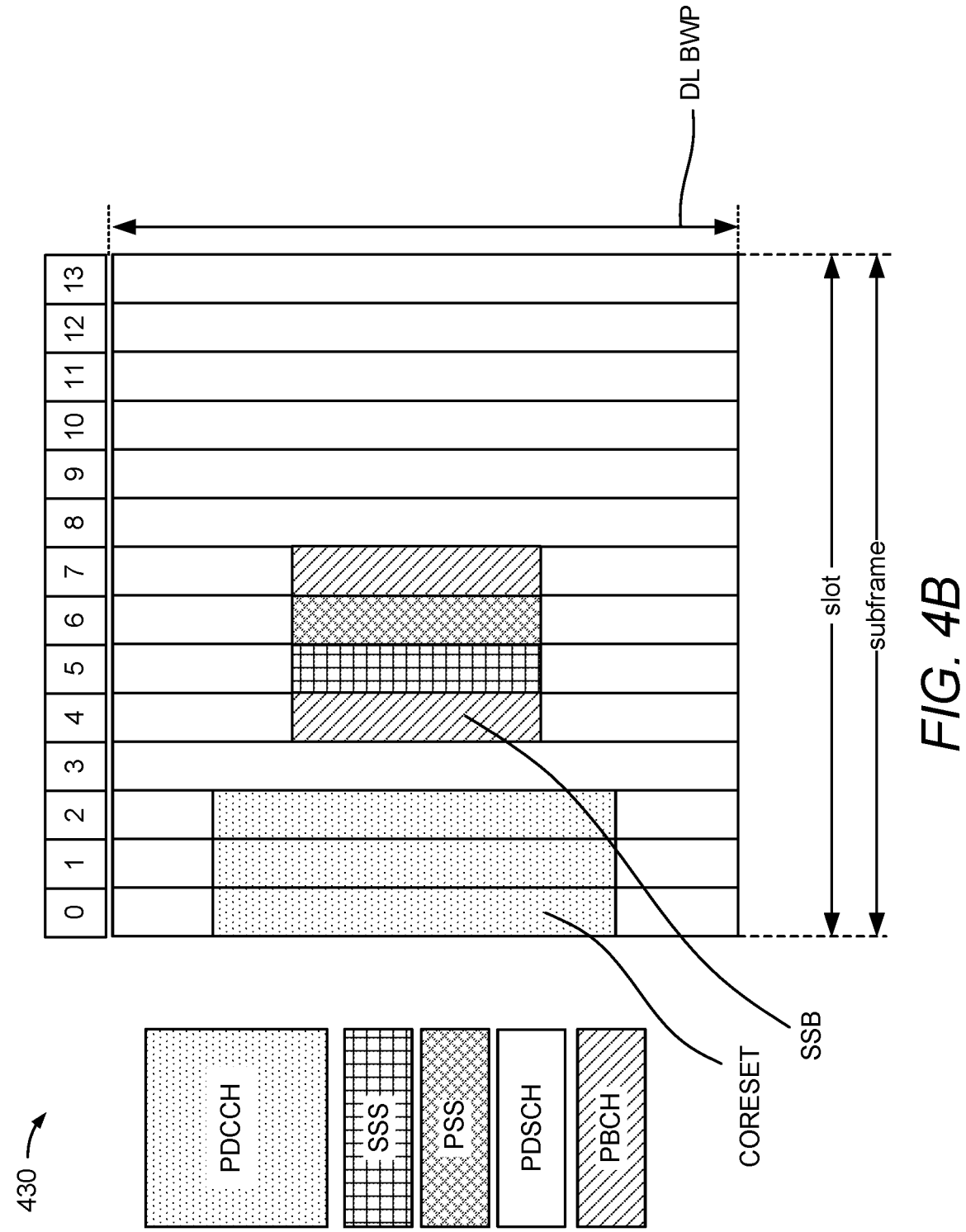

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4 K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4 K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4 K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4 K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4 K FFT size is 800.

In the example of FIGS. 4A and 4B, a numerology of 15 kHz is used. Thus, in the time domain, a 10 ms frame is divided into 10 equally sized subframes of 1 ms each, and each subframe includes one time slot. In FIGS. 4A and 4B, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include positioning reference signals (PRS), tracking reference signals (TRS), phase tracking reference signals (TRS), cell-specific reference signals (CRS), channel state information reference signals (CSI-RS), demodulation reference signals (DMRS), primary synchronization signals (PSS), secondary synchronization signals (SSS), synchronization signal blocks (SSBs), etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity (also referred to as "duty cycle"), a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with μ=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance", a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 5:
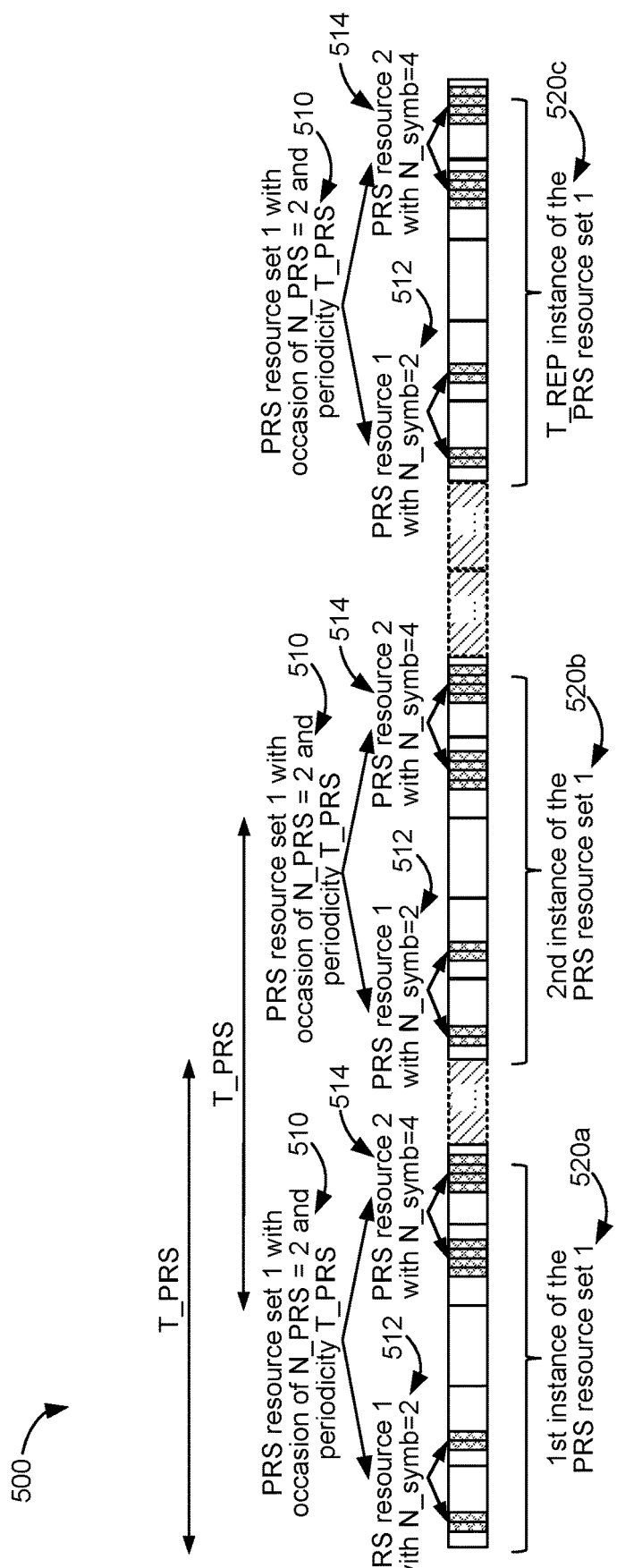
FIG. 5 is a diagram of an example positioning reference signal (PRS) configuration for the PRS transmissions of a given base station, according to aspects of the disclosure.

FIG. 5 is a diagram of an example PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. In the example of FIG. 5, a PRS resource set 510 (labeled "PRS resource set 1") includes two PRS resources, a first PRS resource 512 (labeled "PRS resource 1") and a second PRS resource 514 (labeled "PRS resource 2"). The base station transmits PRS on the PRS resources 512 and 514 of the PRS resource set 510.

The PRS resource set 510 has an occasion length (N_PRS) of two slots and a periodicity (T_S) of, for example, 160 slots or 160 milliseconds (ms) (for 15 kHz subcarrier spacing). As such, both the PRS resources 512 and 514 are two consecutive slots in length and repeat every T_PRS slots, starting from the slot in which the first symbol of the respective PRS resource occurs. In the example of FIG. 5, the PRS resource 512 has a symbol length (N_symb) of two symbols, and the PRS resource 514 has a symbol length (N_symb) of four symbols. The PRS resource 512 and the PRS resource 514 may be transmitted on separate beams of the same base station.

Each instance of the PRS resource set 510, illustrated as instances 520a, 520b, and 520c, includes an occasion of length '2' (i.e., N_PRS=2) for each PRS resource 512, 514 of the PRS resource set. The PRS resources 512 and 514 are repeated every T_PRS slots up to the muting sequence periodicity T_REP. As such, a bitmap of length T_REP would be needed to indicate which occasions of instances 520a, 520b, and 520c of PRS resource set 510 are muted (i.e., not transmitted).

In an aspect, there may be additional constraints on the PRS configuration 500. For example, for all PRS resources (e.g., PRS resources 512, 514) of a PRS resource set (e.g., PRS resource set 510), the base station can configure the following parameters to be the same: (a) the occasion length (T_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

With further reference to DL-PRS, DL-PRS have been defined for NR positioning to enable UEs to detect and measure more neighboring TRPs. Several configurations are supported to enable a variety of deployments (e.g., indoor, outdoor, sub-6 GHz, mmW). In addition, beam sweeping is supported for PRS to support PRS beam operation. The following table illustrates various types of reference signals that can be used for various positioning methods supported in NR.

TABLE 1

| DL/UL Reference Signals | UE Measurements | To support the following positioning techniques |
| --- | --- | --- |
| DL-PRS | DL-RSTD | DL-TDOA |
| DL-PRS | DL-PRS RSRP | DL-TDOA, DL-AoD, Multi-RTT |
| DL-PRS/SRS-for-positioning | UE Rx-Tx | Multi-RTT |
| SSB/CSI-RS for RRM | Synchronization Signal (SS)-RSRP (RSRP for RRM), SS-RSRQ (for RRM), CSI-RSRP (for RRM), CSI-RSRQ (for RRM) | E-CID |

As noted above, NR supports various DL-PRS resource repetition and beam sweeping options. There are several purposes for the repetition of a DL-PRS resource, including (1) receive beam sweeping across repetitions, (2) combining gains for coverage extension, and (3) intra-instance muting. The following table shows the parameters to configure PRS repetition.

TABLE 2

| Parameter | Functionality |
| --- | --- |
| PRS-ResourceRepetitionFactor | Number of times each PRS resource is repeated for a single instance of the PRS resource set. Values: 1, 2, 4, 6, 8, 16, 32 |
| PRS-ResourceTimeGap | Offset in units of slots between two repeated instances of a DL-PRS resource corresponding to the same PRS resource ID within a single instance of the DL-PRS resource set. Values: 1, 2, 4, 8, 16, 32 |

Figure 6:
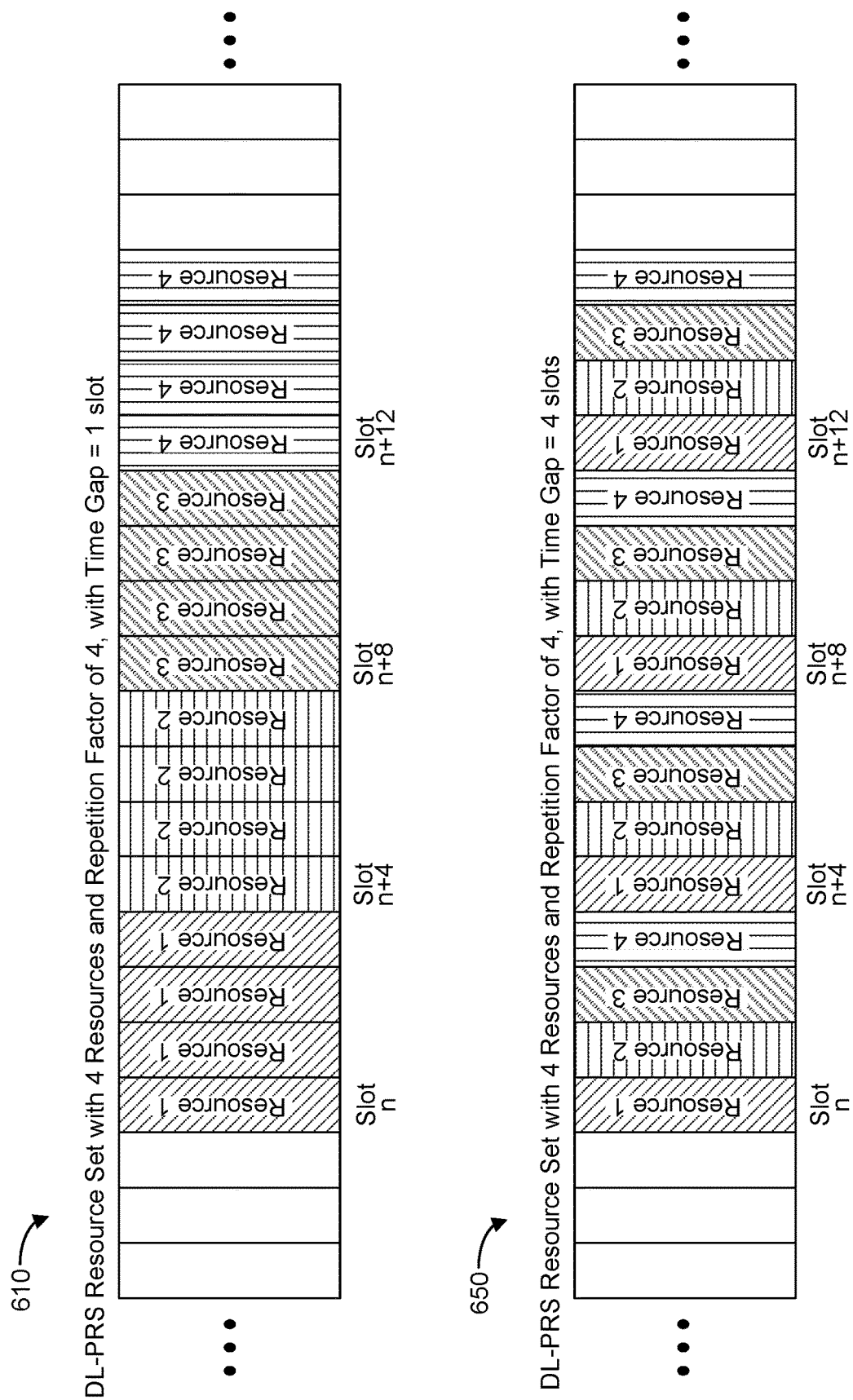
FIG. 6 is a diagram of example PRS resource sets having different time gaps, according to aspects of the disclosure.

FIG. 6 is a diagram of example PRS resource sets having different time gaps, according to aspects of the disclosure. In the example of FIG. 6, time is represented horizontally and frequency is represented vertically. Each block represents a slot in the time domain and some bandwidth in the frequency domain.

FIG. 6 illustrates two DL-PRS resource set configurations, a first DL-PRS resource set configuration 610 and a second DL-PRS resource set configuration 650. Each DL-PRS resource set configuration 610 and 650 comprises four PRS resources (labeled "Resource 1," "Resource 2," "Resource 3," and "Resource 4") and has a repetition factor of four. A repetition factor of four means that each of the four PRS resources is repeated four times (i.e., is transmitted four times) within the DL-PRS resource set. That is, there are four repetitions of each of the four PRS resources within the DL-PRS resource set.

The DL-PRS resource set configuration 610 has a time gap of one slot, meaning that each repetition of a PRS resource (e.g., "Resource 1") starts on the first slot after the previous repetition of that PRS resource. Thus, as illustrated by DL-PRS resource set configuration 610, the four repetitions of each of the four PRS resources are grouped together. Specifically, the four repetitions of PRS resource "Resource 1" occupy the first four slots (i.e., slots n to n+3) of the DL-PRS resource set configuration 610, the four repetitions of PRS resource "Resource 2" occupy the second four slots (i.e., slots n+4 to n+7), the four repetitions of PRS resource "Resource 3" occupy the third four slots (i.e., slots n+8 to n+11), and the four repetitions of PRS resource "Resource 4" occupy the last four slots (i.e., slots n+12 to n+15).

In contrast, the DL-PRS resource set configuration 650 has a time gap of four slots, meaning that each repetition of a PRS resource (e.g., "Resource 2") starts on the fourth slot after the previous repetition of that PRS resource. Thus, as illustrated by DL-PRS resource set configuration 650, the four repetitions of each of the four PRS resources are scheduled every fourth slot. For example, the four repetitions of PRS resource "Resource 1" occupy the first, fifth, ninth, and thirteenth slots (i.e., slots n, n+4, n+8, and n+12) of the DL-PRS resource set configuration 650.

Note that the time duration spanned by one DL-PRS resource set containing repeated DL-PRS resources, as illustrated in FIG. 6, should not exceed the PRS periodicity. In addition, UE receive beam sweeping, for receiving/measuring the DL-PRS resource set, is not specified, but rather, depends on UE implementation.

Figure 7:
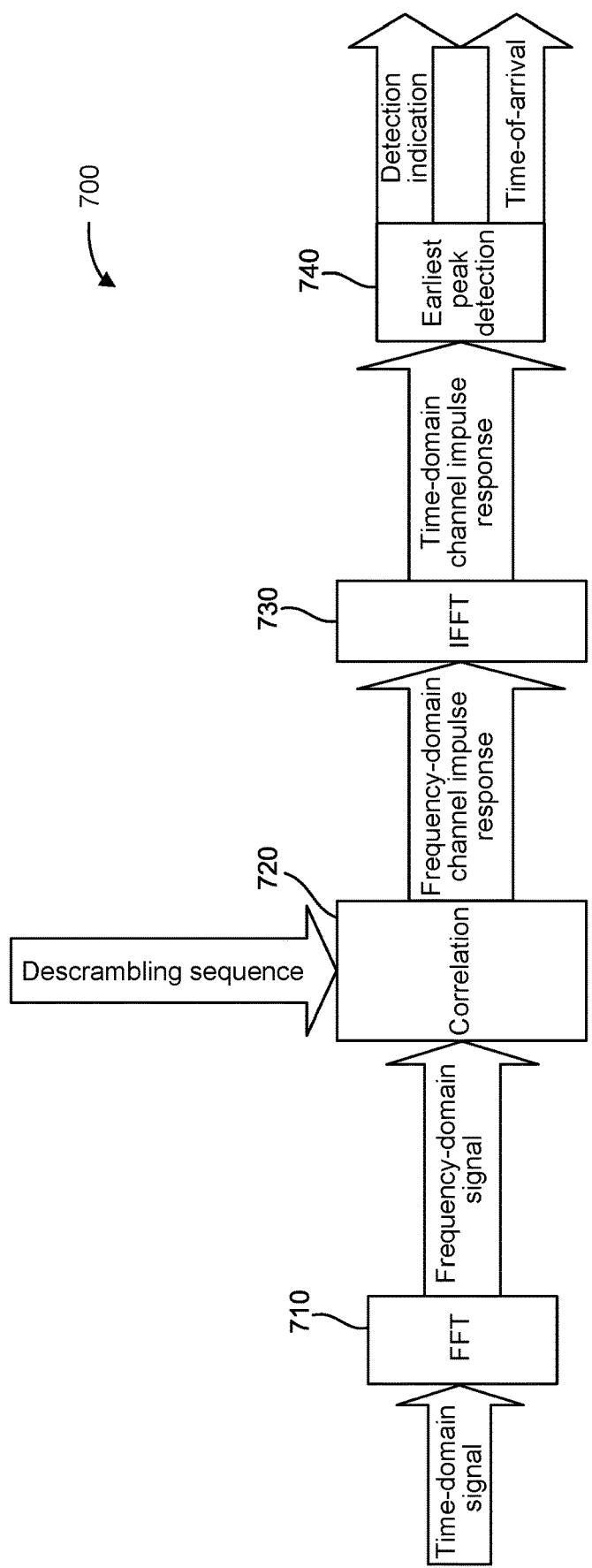
FIG. 7 is a diagram of an example radio frequency (RF) signal processing procedure, according to aspects of the disclosure.

FIG. 7 is a diagram 700 of an example radio frequency (RF) signal processing procedure, according to various aspects of the disclosure. In order to identify the time of arrival (ToA) of an RF signal (e.g., a positioning reference signal (PRS)), the receiver (e.g., a UE) first buffers and then jointly processes all the resource elements (REs) on the channel on which the transmitter (e.g., a base station) is transmitting the RF signal. The receiver then performs an inverse Fourier transform (FFT) to convert the received RF signal to the time domain. The conversion of the received RF signal to the time domain is referred to as the estimation of the channel energy response (CER) or channel impulse response (CIR). The CER shows the peaks on the channel over time, and the earliest "significant" peak should therefore correspond to the ToA of the RF signal. Generally, the receiver will use a noise-related quality threshold to filter out spurious local peaks, thereby presumably correctly identifying significant peaks on the channel. For example, the receiver may choose a ToA estimate that is the earliest local maximum of the CER that is at least 'X' decibels (dB) higher than the median of the CER and a maximum 'Y' dB lower than the main peak on the channel.

Thus, with reference to FIG. 7, at a fast Fourier transform (FFT) stage 710, a receiver (e.g., any of the UEs described herein) receives/measures and buffers a time-domain RF signal (e.g., a PRS) and converts it to a frequency-domain signal. At a correlation stage 720, the receiver generates a frequency-domain channel impulse response from the frequency-domain signal based on a descrambling sequence. At an inverse fast Fourier transform (IFFT) stage 730, the receiver generates a time-domain channel impulse response from the frequency-domain channel impulse response output by the correlation stage 720. At an earliest peak detection stage 740, the receiver generates a detection indication and a ToA of the time-domain RF signal received at the FFT stage 710 based on the time-domain channel impulse response received from the IFFT stage 730.

Where the receiver is a UE, the UE may receive the time-domain RF signal at one or more of antennas 316. The subsequent stages (i.e., FFT stage 710, correlation stage 720, IFFT stage 730, earliest peak detection stage 740) may be performed by the one or more receivers 312, the one or more WWAN transceivers 310, and/or the one or more processors 332, depending on the hardware implementation of the UE. Similarly, where the receiver is a base station, the base station may receive the time-domain RF signal at one or more of antennas 356. The subsequent stages may be performed by the one or more receivers 352, the one or more WWAN transceivers 350, and/or the one or more processors 384, depending on the hardware implementation of the base station.

As will be appreciated from the above, a receiver needs some amount of time to buffer and process an RF signal, such as a PRS. The amount of time needed may depend on various factors, such as the capabilities of the receiver, the number of REs carrying the RF signal, the bandwidth of the RF signal, and the like.

Buffering is needed because the receiver receives the RF signal over time (e.g., over one or more symbols, slots, subframes, etc.), but then needs to process the RF signal on a per slot, per subframe, per resource, per instance, etc. basis. For example, where a UE is measuring a DL-PRS resource (comprising some number of symbols per slot over one or more slots per instance) to determine the ToA of the PRS resource, the UE needs to buffer and then process at least all the symbols of the slot that may contain PRS REs in order to determine the ToA of the PRS resource. Thus, the receiver stores the received/measured RF signal in a buffer as it is received in order to then process the RF signal.

Referring to buffering and processing DL-PRS specifically, different UEs have various DL-PRS buffering and processing capabilities. For example, there is a limit on the maximum number of DL-PRS resources for all TRPs per some period of time that a UE can measure and process. The following table shows various parameters indicating a UE's capabilities.

TABLE 3

| Description | Maximum Number of DL-PRS Resources | Values that can be Signaled as the UE Capability |
|---|---|---|
| Number of frequency layers (X1) | X1 = 4 | Values = {1, 4} |
| Number of TRPs per frequency layer (X2) | X2 = 64 | |
| Number of PRS resource sets per TRP (X3) per frequency layer | X3 = 2 | Values = {1, 2} |
| Number of PRS resources per PRS resource set (X4) | X4 = 64 | |
| Number of DL-PRS resources per UE (X5) | NA | |
| Number of TRPs for all frequency layers (X6) per UE | X6 = 256 | |
| Number of PRS resources per frequency layer (X7) | NA | |

The following table shows various differences between PRS in LTE and NR.

TABLE 4

| Parameter | LTE PRS Baseline | NR PRS |
|---|---|---|
| Number of PRS resources per TRP | Each TRP can configure one PRS resource every T ms | Each TRP can configure X PRS resources every T ms. Example values: X = 64 for FR2, X = 8 for FR1 time division duplex (TDD) |
| FFT Size | 2K | 4K |
| Number of OFDM symbols with PRS per PRS resource | 8 symbols per subframe with repetition over 6 subframes | Up to 12 symbols per slot with repetition of 32 slots |

As shown in the above tables, there are two separate capabilities for PRS processing, one related to the number of PRS resources and one related to the number of PRS symbols. These two capabilities may be referred to as (1) a limit on the maximum number 'N1' of DL-PRS resources a UE is expected to measure across all TRPs and frequency layers within a measurement window of 'T1' ms, reported as a list of duplets {N1, T1}, and (2) a limit on the maximum number of symbols 'N2' in milliseconds containing PRS resources of maximum bandwidth (e.g., 272 PRBs) that a UE is expected to measure within a measurement window of 'T2' ms, reported as a list of duplets {'N1, T2}.

For the UE DL-PRS processing capability, it has been proposed that a UE report one combination of (N, T) values per band, where 'N' is a duration of DL-PRS symbols in milliseconds that the UE can process every 'T' ms for a given maximum bandwidth 'B' in MHz supported by the UE. Here, 'N' and 'T' correspond to 'N2' and 'T2' above. Additionally, a UE can report the number of DL-PRS resources that the UE can process in a slot. This parameter may be reported per SCS per band. The reported number of DL-PRS resources that the UE can process in a slot is selected from the set of {1, 2, 4, 8, 16, 32, 64}. Currently, the following sets of values for 'N,' 'T,' and 'B' are supported: N={0.125, 0.25, 0.5, 1, 2, 4, 8, 12, 16, 20, 25, 30, 35, 40, 45, 50} ms, T={8, 16, 20, 30, 40, 80, 160, 320, 640, 1280} ms, and B={5, 10, 20, 40, 50, 80, 100, 200, 400} MHz.

It has alternatively also been proposed that the reporting of (N, T) values for the maximum bandwidth 'B' in MHz not be dependent on the SCS.

It has further been proposed that a UE capability for simultaneous DL-PRS processing across positioning frequency layers not be supported. That is, for a UE supporting multiple positioning frequency layers, a UE is expected to process only one frequency layer at a time.

Yet another proposal is that the UE capability for DL-PRS processing (e.g., 'N,' 'T') be defined assuming that the UE is configured with measurement gaps. More specifically, the different potential UE capabilities for DL-PRS processing may be defined with the assumption that the UE is configured with measurement gaps and a maximum ratio of the measurement gap length (MGL) to the measurement gap repetition period (MGRP) of no more than 'X' percent (i.e., MGL/MGRP<=X %). A measurement gap is a period of time, configured by the serving base station, during which the serving base station refrains from transmitting downlink data to the UE. The serving base station may also refrain from configuring the UE to transmit uplink data. In that way, during the measurement gap, the UE can measure DL-PRS from neighboring base stations without interference from the serving base station.

If a UE requires measurement gaps to identify and measure intra-frequency cells and/or inter-frequency cells, and the UE does not support independent measurement gap patterns for different frequency ranges, the network may provide a single per-UE measurement gap pattern for concurrent monitoring of all frequency layers. If the UE requires measurement gaps to identify and measure intra-frequency cells and/or inter-frequency cells, and the UE supports independent measurement gap patterns for different frequency ranges. the network may provide either a per-frequency range measurement gap pattern for frequency ranges where the UE requires a per-frequency range measurement gap for concurrent monitoring of all frequency layers of each frequency range independently, or a single per-UE measurement gap pattern for concurrent monitoring of all frequency layers of all frequency ranges. Thus, the UE may be configured with an FR1 measurement gap pattern, an FR2 measurement gap pattern, or a UE-specific measurement gap pattern.

Figure 8:
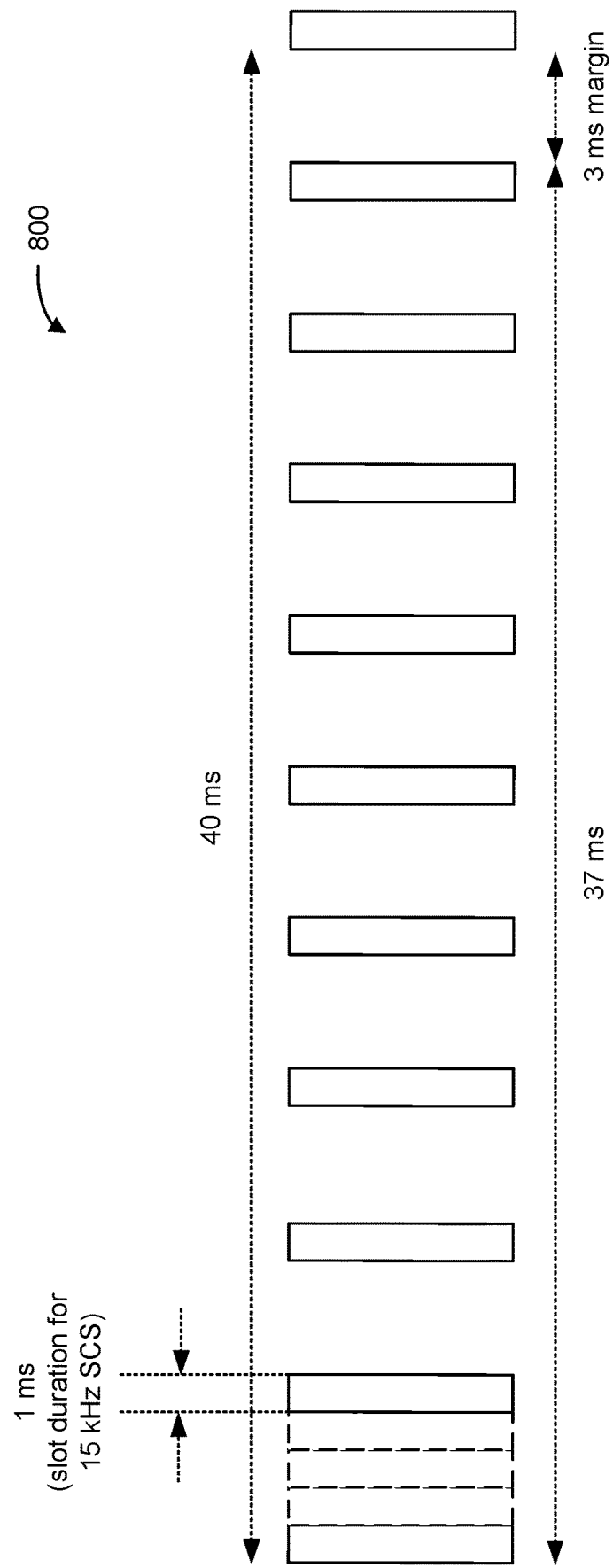
FIG. 8 is a diagram illustrating an example PRS instance, according to aspects of the disclosure.

FIG. 8 is a diagram 800 illustrating an example PRS instance, according to aspects of the disclosure. In FIG. 8, time is represented horizontally, and each block represents a slot (1 ms in length for 15 kHz SCS) containing a PRS resource. The PRS resources may also be referred to as PRS resource repetitions, or simply repetitions, since a specific PRS resource is generally repeated some number of times within a PRS instance, as described above with reference to FIG. 6. In the example of FIG. 8, the length of the illustrated PRS instance is 37 ms (i.e., N_PRS=37 ms) and the periodicity is 40 ms (i.e., T_PRS=40 ms). Every fourth slot contains a PRS resource, for a total of 10 PRS resource repetitions per PRS instance, meaning that within the 37 ms PRS instance, there is a total length of PRS resources of 10 ms.

In the example of FIG. 8, the PRS instance is almost as long as the PRS periodicity, resulting in a very short gap between the last and first PRS resource repetitions of adjacent PRS instances. Specifically, as shown in FIG. 8, there is a gap of 3 ms between the end of the last repetition of the last PRS resource of one PRS instance to the first repetition of the first PRS resource of the next PRS instance. Thus, with reference to FIG. 7, the UE would measure and buffer the PRS resources for the first 37 ms of the PRS periodicity and then process the measured PRS resources in the last 3 ms of the PRS periodicity.

If the UE is configured with a measurement gap to measure the illustrated PRS instance, the length of the measurement gap would need to be at least 37 ms (i.e., MGL=37 ms) and the MGRP would need to be 40 ms (i.e., MGRP=40 ms). In this scenario, there would only be the 3 ms at the end of the 37 ms PRS instance for both PRS processing and communication with the serving base station. As would be appreciated, this is generally unacceptable.

Currently, only the measurement gap patterns listed in Table 5 are supported. A UE determines measurement gap timing based on the gap offset configuration and the measurement gap timing advance configuration provided by higher layer signaling. With reference to FIG. 8 and Table 5, since the length of the PRS instance is greater than the maximum MGL (i.e., 6 ms), the UE may be configured with the maximum MGL. Specifically, the UE may be configured with a 6 ms MGL and a 40 ms MGRP (to match the PRS periodicity). As such, the UE would only be able to measure PRS resources within the 6 ms measurement gap.

TABLE 5

| Gap Pattern ID | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

It has been proposed to add a limited number of new measurement gap patterns. Possible candidates include measurement gaps with an MGL of {10, 20, 40, 50} ms and an MGRP of {80, 160, 320, 640} ms.

A UE may not always be configured with measurement gaps. During measurement gaps, as noted above, there is no other communication, which increases latency and reduces throughput to the UE. This can be problematic for low latency data traffic, such as ultra-reliable low latency communication (URLLC) traffic. When a UE is not configured with measurement gaps, it needs to report its capability to buffer and process inter-frequency PRS resources without the assistance of measurement gaps.

The present disclosure provides techniques for determining the minimum PRS processing capability of a UE when the UE is not configured with measurement gaps. With respect to PRS processing without measurement gaps, there are several options for the worst-case scenario for the PRS instance length per PRS periodicity length (e.g., 37 ms per 40 ms in the example of FIG. 8), or, said another way, the ratio of the PRS instance length to the PRS periodicity length (e.g., N_PRS/T_PRS).

As a first option, the PRS instance length per PRS periodicity length may be as much as the worst-case for the MGL per MGRP (i.e., MGL/MGRP) when measurement gaps are configured. For example, from Table 5 above, the worst-case scenario is an MGL of 6 ms and an MGRP of 20 ms.

As a second option, the UE may report a separate capability for the maximum PRS instance length per PRS periodicity length that it can process when measurement gaps are not configured. That is, there may be one capability for when measurement gaps are configured and another capability for when measurement gaps are not configured.

As a third option, there may be a minimum gap between the last repetition of the last PRS resource of a PRS instance to the first repetition of a first PRS resource of the subsequent PRS instance (e.g., the 3 ms gap illustrated in FIG. 8). As a first sub-option, the minimum gap may be between the last repetition of the last PRS resource of a PRS instance and the first repetition of a first PRS resource of the subsequent PRS instance of the same frequency layer. Alternatively, as a second sub-option, the minimum gap may be between the last repetition of the last PRS resource of a PRS instance and the first repetition of a first PRS resource of the subsequent PRS instance across all frequency layers. The minimum gap may depend on the SCS, or slot duration, or additional reported UE capability(ies). In this option, the UE would not be expected to process PRS resources that are closer than the minimum gap to the upcoming start of a PRS instance. The minimum gap may be equal to the minimum MGRP minus the MGL specified, or may be based on the MGL and MGRP supported by the UE.

As a fourth option, the worst-case scenario for the PRS instance length per PRS periodicity length (e.g., N_PRS/T_PRS) may be a factor (e.g., less than '1') of the MGL per MGRP or the MGRP minus the MGL. For example, it may be 50% of the worst-case MGL per MGRP. That is, the PRS instance length per PRS periodicity length may be less than or equal to 0.5 times the worst-case MGL per MGRP.

As another technique for when measurement gaps are not configured, a UE may report the minimum number of PRS resources per slot that it can support. As a first option, the minimum number of PRS resources per slot may depend on the SCS as follows: (1) 16 PRS resource per slot in 15 kHz SCS, (2) eight PRS resource per slot in 30 kHz SCS, (3) four PRS resources per slot in 60 kHz SCS (for both FR1 and FR2), and (4) two PRS resource per slot in 120 kHz SCS. It may depend on the SCS by a scaling factor for different SCS. For example, for a first SCS (denoted "SCS1") with 'X' PRS resources per slot supported as a minimum number of PRS resources per slot, then a second SCS (denoted "SCS2") may equal "SCS1" times 'K,' for values of 'K' greater than '1,' and a UE may support 'X' per 'K' PRS resources per slot at a minimum.

As a second option, the minimum number of PRS resources per slot may be a fixed number for FR1 and FR2 independent of the SCS inside FR1 and FR2. For example, it may be 16 PRS resources per slot in FR1, for all SCSs supported in FR1, and two PRS resources per slot in FR2, for all SCSs supported in FR2.

As a third option, the minimum number of PRS resources per slot may be smaller than (e.g., a fraction of) the reported value when measurement gaps are configured. For example, if the UE reports that it can process 16 PRS resources per slot when measurement gaps are configured, then it may be expected to support eight (0.5×16=8) PRS resources per slot if measurement gaps are not configured.

As another technique for when measurement gaps are not configured, the minimum number of PRS symbols 'N' in a window of 'T' ms, also referred to as the (N, T) capability, may be based on the available MGL configurations and the MGRP configurations. As a first option, the minimum number of PRS symbols 'N' that the UE can buffer may be the same as the smallest currently-specified MGL. As shown in Table 5, that is 1.5 ms. As a second option, the minimum number of PRS symbols 'N' that the UE can process within a window of 'T' ms, may be the same as the largest MGL that the UE can support for FR1 and FR2 separately. For example, if the UE reports a capability of MGLs equal to 6 ms, then 'N' would also be 6 ms.

With regards to the value of 'T' that is assumed when measurement gaps are not configured, as a first option, the value of 'T' may be the minimum MGRP from Table 5 that is larger than the value of 'T' that would be reported when measurement gaps are configured. As a second option, the value of 'T' may be a chosen MGRP for FR1 and FR2 separately. As a third option, the minimum length of the measurement window 'T' may be the same as the largest MGRP the UE supports for FR1 and FR2 separately. As a fourth option, the minimum length of the measurement window 'T' may be the same as the largest MGRP in Table 5, that is, 160 ms.

In an aspect, when measurement gaps are not configured, for a different PRS periodicity, a different number of PRS symbols in milliseconds a UE is assumed to support may be equal to (1) one of the combination of the supported (MGL, MGRP) patterns in Table 5, or (2) the (N, T) that is equal to all the supported (MGL, MGRP) patterns in FR1 and FR2 separately.

In an aspect, when measurement gaps are not configured, (N, T) may be selected such that all UEs must support, for different SCS or FR1/FR2, (1) values of 'N' selected from {0.125, 0.25, 0.5, 1, 2, 4, 8, 12, 16, 20, 25, 30, 35, 40, 45, 50} ms, or (2) values of 'T' selected from {8, 16, 20, 30, 40, 80, 160, 320, 640, 1280} ms. In addition, the maximum bandwidth 'B' supported by the UE may be the same as the one reported when measurement gaps are configured.

In an aspect, a UE may report the above-described capabilities to a location server in one or more LPP messages (e.g., an LPP Report Capabilities message), or to the serving base station in one or more RRC messages, one or more MAC control elements (MAC-CEs), or uplink control information (UCI).

Figure 9:
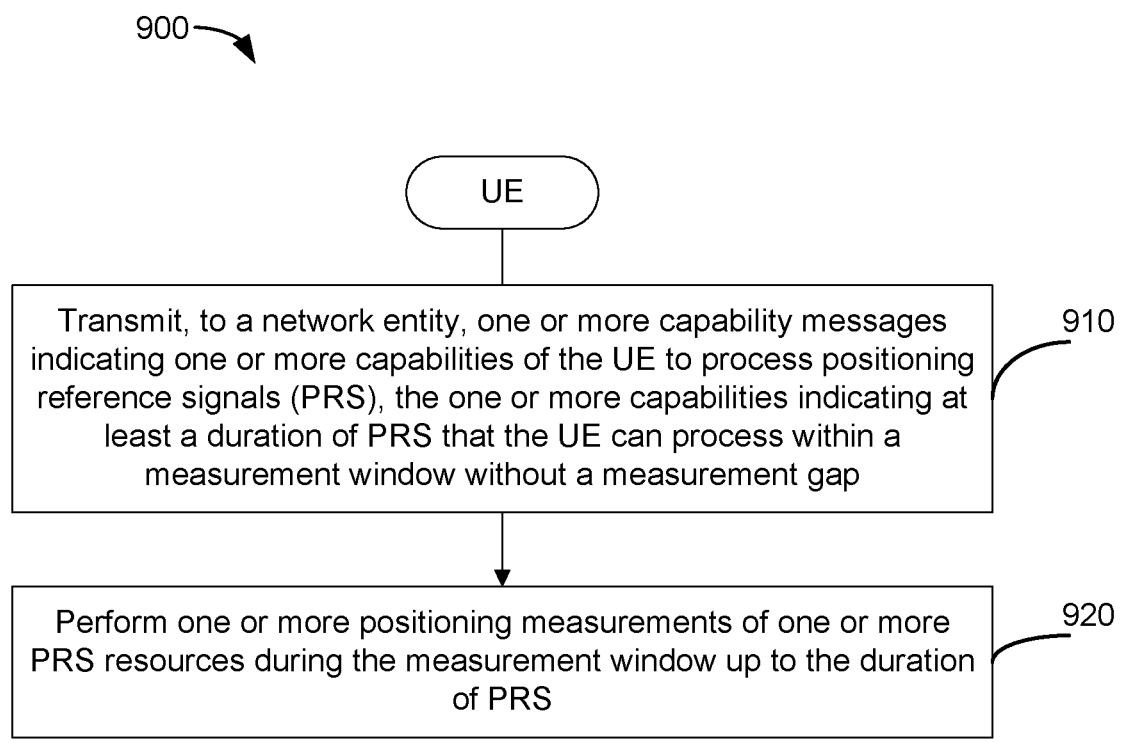
FIG. 9 illustrates an example method of wireless communication, according to aspects of the disclosure.

FIG. 9 illustrates an example method 900 of wireless communication, according to aspects of the disclosure. In an aspect, method 900 may be performed by a UE (e.g., any of the UEs described herein).

At 910, the UE transmits, to a network entity (e.g., a location server, a serving base station), one or more capability messages indicating one or more capabilities of the UE to process PRS, the one or more capabilities indicating at least a duration of PRS that the UE can process within a measurement window without a measurement gap. In an aspect, operation 910 may be performed by the one or more WWAN transceivers 310, the one or more processors 332, memory 340, and/or positioning component 342, any or all of which may be considered means for performing this operation.

At 920, the UE performs one or more positioning measurements of one or more PRS resources during the measurement window up to the duration of PRS. In an aspect, operation 920 may be performed by the one or more WWAN transceivers 310, the one or more processors 332, memory 340, and/or positioning component 342, any or all of which may be considered means for performing this operation.

As will be appreciated, a technical advantage of the method 900 is enabling a UE to report, and then be configured with, PRS instances that the UE is capable of measuring without measurement gaps.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: transmitting, to a network entity, one or more capability messages indicating one or more capabilities of the UE to process positioning reference signals (PRS), the one or more capabilities indicating at least a duration of PRS that the UE can process within a measurement window without a measurement gap; and performing one or more positioning measurements of one or more PRS resources during the measurement window up to the duration of PRS.

Clause 2. The method of clause 1, wherein: the duration of PRS is related to the PRS instance length, and the measurement window is related to a PRS periodicity.

Clause 3. The method of clause 2, wherein a ratio of the PRS instance length to the PRS periodicity is equal to a ratio of a measurement gap length to a measurement gap repetition periodicity that the UE can support when measurement gaps are configured.

Clause 4. The method of any of clauses 2 to 3, wherein the one or more capabilities further indicate a PRS instance length and a PRS periodicity that the UE can process with a measurement gap.

Clause 5. The method of any of clauses 1 to 4, wherein the one or more capabilities indicate a minimum gap between a last repetition of a last PRS resource of a PRS instance to a first repetition of a first PRS resource of a subsequent PRS instance.

Clause 6. The method of clause 5, wherein the last repetition of the last PRS resource of the PRS instance and the first repetition of the first PRS resource of the subsequent PRS instance are on the same frequency layer.

Clause 7. The method of clause 5, wherein the last repetition of the last PRS resource of the PRS instance and the first repetition of the first PRS resource of the subsequent PRS instance are on different frequency layers.

Clause 8. The method of any of clauses 5 to 7, wherein the minimum gap depends on a subcarrier spacing or slot duration of the last repetition of the last PRS resource of the PRS instance and the first repetition of the first PRS resource of the subsequent PRS instance.

Clause 9. The method of any of clauses 5 to 8, wherein the UE is not expected to process PRS resources that are closer than the minimum gap to the subsequent PRS instance.

Clause 10. The method of any of clauses 5 to 9, wherein the minimum gap equals a ratio of a measurement gap length to a measurement gap repetition periodicity.

Clause 11. The method of any of clauses 2 to 10, wherein a ratio of the PRS instance length to the PRS periodicity is a factor of a ratio of a measurement gap length to a measurement gap repetition periodicity.

Clause 12. The method of clause 1, wherein: the duration of PRS is indicated as a number of PRS resources, and the measurement window is a slot.

Clause 13. The method of clause 12, wherein a minimum of the number of PRS resources within the slot is based on a subcarrier spacing of the slot.

Clause 14. The method of clause 13, wherein the minimum of the number of PRS resources within the slot comprises: 16 PRS resources for 15 kilohertz (kHz) subcarrier spacing, 8 PRS resources for 30 kHz subcarrier spacing, 4 PRS resources for 60 kHz subcarrier spacing, and 2 PRS resources for 120 kHz subcarrier spacing.

Clause 15. The method of clause 13, wherein the minimum of the number of PRS resources within the slot comprises: 16 PRS resources for frequency range 1 (FR1), and 2 PRS resources for frequency range 2 (FR2).

Clause 16. The method of any of clauses 12 to 15, wherein the minimum of the number of PRS resources within the slot is smaller than the number of PRS resources within the slot that the UE can support when measurement gaps are configured.

Clause 17. The method of clause 1, wherein: the duration of PRS is indicated as a number of PRS symbols 'N,' and the measurement window is indicated as a number of milliseconds 'T.'

Clause 18. The method of clause 17, wherein a minimum of the number of PRS symbols 'N' is equal to a smallest measurement gap length the UE can support.

Clause 19. The method of clause 17, wherein a minimum of the number of PRS symbols 'N' is equal to a largest measurement gap length the UE can support.

Clause 20. The method of clause 19, wherein the minimum of the number of PRS symbols 'N' is based on whether the PRS are in FR1 or FR2.

Clause 21. The method of any of clauses 17 to 20, wherein the number of milliseconds 'T' is equal to a smallest measurement gap repetition periodicity larger than a second number of milliseconds 'T' the UE supports when measurement gaps are supported.

Clause 22. The method of clause 17 to 20, wherein the number of milliseconds 'T' is equal to a first measurement gap repetition periodicity for FR1 or a second measurement gap repetition periodicity for FR2.

Clause 23. The method of any of clauses 17 to 20, wherein the number of milliseconds 'T' is equal to a largest measurement gap repetition periodicity that the UE supports for FR1 or FR2.

Clause 24. The method of clause 17 to 20, wherein the number of milliseconds 'T' is equal to a largest measurement gap repetition periodicity that the UE supports.

Clause 25. The method of any of clauses 17 to 24, wherein: the number of PRS symbols 'N' is equal to a measurement gap length, and the number of milliseconds 'T' is equal to a measurement gap repetition periodicity.

Clause 26. The method of clause 25, wherein the measurement gap length and the measurement gap repetition periodicity are based on whether the PRS are in FR1 or FR2.

Clause 27. The method of any of clauses 17 to 26, wherein: values of 'N' are selected from a set of {0.125, 0.25, 0.5, 1, 2, 4, 8, 12, 16, 20, 25, 30, 35, 40, 45, 50} ms, and values of 'T' are selected from a set of {8, 16, 20, 30, 40, 80, 160, 320, 640, 1280} ms.

Clause 28. The method of any of clauses 1 to 27, wherein a maximum bandwidth supported by the UE when measurement gaps are not configured is the same as when measurement gaps are configured.

Clause 29. The method of any of clauses 1 to 28, wherein: the network entity is a location server, and the one or more capability messages comprise one or more Long-Term Evolution (LTE) positioning protocol (LPP) messages.

Clause 30. The method of any of clauses 1 to 28, wherein: the network entity is a serving base station, and the one or more capability messages comprise one or more radio resource control (RRC) messages, one or more medium access control control elements (MAC-CEs), or uplink control information.

Clause 31. An apparatus comprising a memory, at least one transceiver, and at least one processor communicatively coupled to the memory and the at least one transceiver, the memory, the at least one transceiver, and the at least one processor configured to perform a method according to any of clauses 1 to 30.

Clause 32. An apparatus comprising means for performing a method according to any of clauses 1 to 30.

Clause 33. A non-transitory computer-readable medium storing computer-executable instructions, the computer-executable comprising at least one instruction for causing a computer or processor to perform a method according to any of clauses 1 to 30.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    transmitting, to a network entity, one or more capability messages indicating one or more capabilities of the UE to process positioning reference signals (PRS), wherein the one or more capabilities indicate at least a duration of PRS that the UE can process within a measurement window without a measurement gap, wherein the one or more capabilities indicate a minimum gap between a last repetition of a last PRS resource of a PRS instance and an end of the measurement window, and wherein the UE is not expected to process PRS resources that are closer than the minimum gap to the end of the measurement window; and performing one or more positioning measurements of one or more PRS resources during the measurement window up to the duration of PRS.

2. The method of claim 1, wherein:
the duration of PRS is related to a PRS instance length, and
the measurement window is related to a PRS periodicity.

3. The method of claim 2, wherein a ratio of the PRS instance length to the PRS periodicity is equal to a ratio of a measurement gap length to a measurement gap repetition periodicity that the UE can support when measurement gaps are configured.

4. The method of claim 2, wherein the one or more capabilities further indicate the PRS instance length and the PRS periodicity that the UE can process with a measurement gap.

5. The method of claim 2, wherein a ratio of the PRS instance length to the PRS periodicity is a factor of a ratio of a measurement gap length to a measurement gap repetition periodicity.

6. The method of claim 1, wherein the last repetition of the last PRS resource of the PRS instance and a first repetition of a first PRS resource of a subsequent PRS instance are on the same frequency layer.

7. The method of claim 1, wherein the last repetition of the last PRS resource of the PRS instance and a first repetition of a first PRS resource of a subsequent PRS instance are on different frequency layers.

8. The method of claim 1, wherein the minimum gap depends on a subcarrier spacing or slot duration of the last repetition of the last PRS resource of the PRS instance and the first repetition of the first PRS resource of the subsequent PRS instance.

9. The method of claim 1, wherein the minimum gap equals a ratio of a measurement gap length to a measurement gap repetition periodicity.

10. The method of claim 1, wherein:
the duration of PRS is indicated as a number of PRS resources, and
the measurement window is a slot.

11. The method of claim 10, wherein a minimum of the number of PRS resources within the slot is based on a subcarrier spacing of the slot.

12. The method of claim 11, wherein the minimum of the number of PRS resources within the slot comprises:
16 PRS resources for 15 kilohertz (kHz) subcarrier spacing,
8 PRS resources for 30 kHz subcarrier spacing,
4 PRS resources for 60 kHz subcarrier spacing, and
2 PRS resources for 120 kHz subcarrier spacing.

13. The method of claim 11, wherein the minimum of the number of PRS resources within the slot comprises:
16 PRS resources for frequency range 1 (FR1), and
2 PRS resources for frequency range 2 (FR2).

14. The method of claim 10, wherein a minimum of the number of PRS resources within the slot is smaller than the number of PRS resources within the slot that the UE can support when measurement gaps are configured.

15. The method of claim 1, wherein:
the duration of PRS is indicated as a number of PRS symbols 'N,' and
the measurement window is indicated as a number of milliseconds 'T'.

16. The method of claim 15, wherein a minimum of the number of PRS symbols 'N' is equal to a smallest measurement gap length the UE can support.

17. The method of claim 15, wherein a minimum of the number of PRS symbols 'N' is equal to a largest measurement gap length the UE can support.

18. The method of claim 17, wherein the minimum of the number of PRS symbols 'N' is based on whether the PRS are in FR1 or FR2.

19. The method of claim 15, wherein the number of milliseconds 'T' is equal to a smallest measurement gap repetition periodicity larger than a second number of milliseconds 'T' the UE supports when measurement gaps are supported.

20. The method of claim 15, wherein the number of milliseconds 'T' is equal to a first measurement gap repetition periodicity for FR1 or a second measurement gap repetition periodicity for FR2.

21. The method of claim 15, wherein the number of milliseconds 'T' is equal to a largest measurement gap repetition periodicity that the UE supports for FR1 or FR2.

22. The method of claim 15, wherein the number of milliseconds 'T' is equal to a largest measurement gap repetition periodicity that the UE supports.

23. The method of claim 15, wherein:
the number of PRS symbols 'N' is equal to a measurement gap length, and
the number of milliseconds 'T' is equal to a measurement gap repetition periodicity.

24. The method of claim 23, wherein the measurement gap length and the measurement gap repetition periodicity are based on whether the PRS are in FR1 or FR2.

25. The method of claim 15, wherein:
values of 'N' are selected from a set of {0.125, 0.25, 0.5, 1, 2, 4, 8, 12, 16, 20, 25, 30, 35, 40, 45, 50} ms, and
values of 'T' are selected from a set of {8, 16, 20, 30, 40, 80, 160, 320, 640, 1280} ms.

26. The method of claim 1, wherein a maximum bandwidth supported by the UE when measurement gaps are not configured is the same as when measurement gaps are configured.

27. The method of claim 1, wherein:
the network entity is a location server, and
the one or more capability messages comprise one or more Long-Term Evolution (LTE) positioning protocol (LPP) messages.

28. The method of claim 1, wherein:
the network entity is a serving base station, and
the one or more capability messages comprise one or more radio resource control (RRC) messages, one or more medium access control control elements (MAC-CEs), or uplink control information.

29. A user equipment (UE), comprising:
one or more memories;
one or more transceivers; and
one or more processors communicatively coupled to the one or more memories and the one or more transceivers, the one or more processors, either alone or in combination, configured to:
transmit, via the one or more transceivers, to a network entity, one or more capability messages indicating one or more capabilities of the UE to process positioning reference signals (PRS), wherein the one or more capabilities indicate at least a duration of PRS that the UE can process within a measurement window without a measurement gap, wherein the one or more capabilities indicate a minimum gap between a last repetition of a last PRS resource of a PRS instance and an end of the measurement window, and wherein the UE is not expected to process PRS resources that are closer than the minimum gap to the end of the measurement window; and perform one or more positioning measurements of one or more PRS resources during the measurement window up to the duration of PRS.

30. A user equipment (UE), comprising:

means for transmitting, to a network entity, one or more capability messages indicating one or more capabilities of the UE to process positioning reference signals (PRS), wherein the one or more capabilities indicate at least a duration of PRS that the UE can process within a measurement window without a measurement gap, wherein the one or more capabilities indicate a minimum gap between a last repetition of a last PRS resource of a PRS instance and an end of the measurement window, and wherein the UE is not expected to process PRS resources that are closer than the minimum gap to the end of the measurement window; and means for performing one or more positioning measurements of one or more PRS resources during the measurement window up to the duration of PRS.

31. A non-transitory computer-readable medium storing computer-executable instructions that, when executed by a user equipment (UE), cause the UE to:

transmit, to a network entity, one or more capability messages indicating one or more capabilities of the UE to process positioning reference signals (PRS), wherein the one or more capabilities indicate at least a duration of PRS that the UE can process within a measurement window without a measurement gap, wherein the one or more capabilities indicate a minimum gap between a last repetition of a last PRS resource of a PRS instance and an end of the measurement window, and wherein the UE is not expected to process PRS resources that are closer than the minimum gap to the end of the measurement window; and perform one or more positioning measurements of one or more PRS resources during the measurement window up to the duration of PRS.

* * * * *